United States Patent
Halbrook, Jr. et al.

[11] Patent Number: 5,883,043
[45] Date of Patent: Mar. 16, 1999

[54] THERMAL PAPER WITH SECURITY FEATURES

[75] Inventors: Wendell B. Halbrook, Jr., Waynesville, Ohio; Christopher L. Langston, Jackson, Tenn.; Maurice W. Lewis, Dayton; Yaoping Tan, Miamisburg, both of Ohio

[73] Assignee: NCR Corporation, Dayton, Ohio

[21] Appl. No.: 919,041

[22] Filed: Aug. 27, 1997

[51] Int. Cl.[6] .................................................. B41M 5/30
[52] U.S. Cl. .................. 503/204; 427/152; 427/288; 503/206
[58] Field of Search ................. 427/150, 152, 427/256, 288; 503/200, 204, 206, 226

[56] References Cited

U.S. PATENT DOCUMENTS

| | | | |
|---|---|---|---|
| 3,429,825 | 2/1969 | Voedisch | 252/301.2 |
| 3,596,275 | 7/1971 | Sweet | 346/1 |
| 3,663,278 | 5/1972 | Blose et al. | 117/234 |
| 4,150,997 | 4/1979 | Hayes | 106/15.05 |
| 4,153,593 | 5/1979 | Zabiak et al. | 260/29.6 ME |
| 4,269,627 | 5/1981 | Hwang | 106/22 |
| 4,315,643 | 2/1982 | Tokunaga et al. | 282/27.5 |
| 4,328,332 | 5/1982 | Hayes et al. | 528/296 |
| 4,370,370 | 1/1983 | Iwata et al. | 428/40 |
| 4,388,362 | 6/1983 | Iwata et al. | 428/211 |
| 4,403,224 | 9/1983 | Wirnowski | 346/1.1 |
| 4,424,245 | 1/1984 | Maruta et al. | 428/40 |
| 4,444,819 | 4/1984 | Maruta et al. | 346/209 |
| 4,507,669 | 3/1985 | Sakamoto et al. | 346/207 |
| 4,551,738 | 11/1985 | Maruta et al. | 346/200 |
| 4,682,194 | 7/1987 | Usami et al. | 503/215 |
| 4,687,701 | 8/1987 | Knirsch et al. | 428/216 |
| 4,722,921 | 2/1988 | Kiritani et al. | 503/207 |
| 4,742,043 | 5/1988 | Tanaka et al. | 503/213 |
| 4,783,493 | 11/1988 | Motegi et al. | 524/13 |
| 4,942,150 | 7/1990 | Usami et al. | 503/213 |
| 5,106,998 | 4/1992 | Tanaka et al. | 549/331 |
| 5,155,230 | 10/1992 | Hibino et al. | 549/409 |
| 5,177,218 | 1/1993 | Fischer et al. | 549/25 |
| 5,206,395 | 4/1993 | Fischer et al. | 552/201 |
| 5,240,781 | 8/1993 | Obata et al. | 428/488.4 |
| 5,266,447 | 11/1993 | Takahashi et al. | 430/345 |
| 5,348,348 | 9/1994 | Hanada et al. | 283/91 |
| 5,368,334 | 11/1994 | Christy et al. | 283/67 |
| 5,384,077 | 1/1995 | Knowles | 252/586 |
| 5,405,958 | 4/1995 | VanGemert | 544/71 |
| 5,407,885 | 4/1995 | Fischer et al. | 502/177 |
| 5,426,143 | 6/1995 | de Wit et al. | 524/206 |
| 5,429,774 | 7/1995 | Kumar | 252/586 |
| 5,446,151 | 8/1995 | Rickwood et al. | 544/71 |
| 5,468,581 | 11/1995 | Coe et al. | 430/22 |
| 5,480,482 | 1/1996 | Novinson | 106/498 |
| 5,500,040 | 3/1996 | Fujinami | 106/21 A |

FOREIGN PATENT DOCUMENTS

| | | | |
|---|---|---|---|
| 0327788 | 8/1989 | European Pat. Off. | 428/195 |
| 920414 | 3/1963 | United Kingdom | 428/195 |
| 2272861 | 6/1994 | United Kingdom | 428/195 |

OTHER PUBLICATIONS

Patent Abstracts of Japan, vol. 012, No. 300 (P–745), 16 Aug. 1988 & JP 63 074053 A (Mitsubishi Electric Corp), 4 Apr. 1988.

*Primary Examiner*—Bruce H. Hess
*Attorney, Agent, or Firm*—Richard J. Traverso

[57] ABSTRACT

A thermal paper with an image derived from a water-based security ink has more than one means of security. A variable light absorbing and/or transmitting pigment or dye in the ink is a first security and a water repelling agent in the ink is a second security. A pseudo-watermark from the coloration of the ink under ambient conditions is a third security. Visible images can be generated from the printed ink upon exposure to UV or infrared light. Methods of preparing the thermal paper comprise printing the security ink on thermal paper with only one thermosensitive coating on the surface opposite the thermosensitive coating.

23 Claims, 2 Drawing Sheets

THERMAL PAPER WITH SECURITY FEATURES

FIELD OF THE INVENTION

The present invention relates to security inks used to thwart counterfeiting of printed commercial documents such as sales transaction records and receipts. More particularly, the invention relates to the use of security features on thermosensitive recording materials such as thermal paper.

BACKGROUND OF THE INVENTION

Many different means of security are available to prevent duplication of printed commercial documents such as special papers (water marked paper) and special inks (fluorescent inks and other optically variable inks) which form latent images or images that change color.

The use of latent images as a security measure is well known. To be useful as a security measure, latent images must be well camouflaged but readily and easily viewable to the user, preferably by a simple procedure. An example of such a latent image is described in U.S. Pat. No. 5,468,581, which is formed when printing documents using an intaglio process. The latent image is overprinted on the visible image such that the latent image is visible when the document is tilted and viewed at an angle. The latent image is caused by the variation of the slight shadow from the raised ink pattern formed by the intaglio process or other printing method which produces raised ink patterns.

Optically variable inks have been used to provide latent images and images which change color when exposed to a light source other than ambient light. These optically variable inks allow for non-destructive testing of the security feature allowing the printing of such inks to be monitored. Such optically variable inks typically contain a fluorescent compound or photochromic compound which responds to infrared or ultraviolet light. An example of an aqueous printing ink for jet printing which fluoresces under ultraviolet radiation is described in U.S. Pat. No. 4,153,593. The dyes described in this reference are water soluble and include fluorescein, eosine dyes and Rhodamine dyes. Representative disclosures of other inks include U.S. Pat. No. 4,328,332, issued to Hayes et al. on May 4, 1982, and U.S. Pat. No. 4,150,997, issued to Hayes on Apr. 24, 1979. While the use of fluorescent inks and dyes has been effective and versatile, with the advent of todays personal computers and color copiers, conventional security measures such as these have been overcome, particularly where records are only casually inspected, such as sales receipts and transaction records. Therefore, it is desirable to provide additional security measures to supplement the fluorescent pigments and dyes.

Adding additional security measures is complicated by many factors. One is that there are many types of printing inks with compositions adapted to be employed in particular printing operations. For example, the inks for ink jet printers often must be conductive, have viscosity values within a certain range and contain no large particulate matter (below 5 $\mu$m) and the ink should not dry within the ink jet over short periods of time. Jet printing processes are described in Report No. 1722-1 of the Stanford University Electronic Research Laboratory dated March 1964, entitled "High Frequency of Oscillography with Electrostatically Deflected Ink Jets", and U.S. Pat. Nos. 3,596,275, 4,269,627, 4,153,593, 4,328,332, and 4,150,997.) Special ink formulations are often employed in relief printing, offset printing, intaglio printing, lithography and silkscreening.

Another factor which complicates adding a security measure to a security ink is that water-based inks are preferred to minimize the impact on the environment and avoid flammable vapors during use. This limits the components that can be added to the security ink.

An additional factor which complicates adding a security measure to a security ink is that it is difficult to complement the performance of fluorescent and photochromic pigments and dyes within optically variable inks without interfering with their performance. Parameters such as these place limitations on the additives or other components which can be used with security inks, making it difficult to provide multiple security measures within a security ink.

The above factors must be considered for the inks to be printed on plain paper. Where the security features are desired for thermal paper, the ink has additional requirements due to the special thermosensitive coatings thereon which generate images when activated by heat. The inks must not prereact the reactive components within the thermosensitive coating of the thermal paper to detract from the papers printing performance. Certain chemical factors can adversely affect and degrade the performance of the thermosensitive coating and should be avoided such as some organic solvents (ketones), plasticizers (polyethylene glycol type) amines (ammonia) and certain oils (soy oil).

Direct thermal paper is a thermosensitive recording material on which print or a design is obtained by the application of heat energy. Thermal paper comprises a base sheet and a coating, and like other coated papers, the coating is applied to give new properties to the base sheet. However, a major distinction in thermal paper from other coated papers is that special color forming chemicals and additives are present in the coatings such that when heat is applied by a thermal head, the color forming chemicals react to develop the desired print or image.

The most common type of thermal coating is the dye-developing type system. The three main color producing components in a dye developing-type thermal are colorless dye (color former), a bisphenol or an acidic material (color developer) and sensitizer. These solid materials are reduced to very small particles by grinding and incorporated into a coating formulation along with any optional additives such as pigments, binders and lubricants. This coating formulation is then applied to the surface of paper or other support system using various types of coloring application systems and dried. Images are formed on the coated surfaces by the application of heat to melt and interact the three color producing materials.

To protect thermal paper from environmental conditions, and premature coloration from handling, a number of developments have been made. One is to produce a barrier or protection layer on top of the thermal coating (see U.S. Pat. Nos. 4,370,370; 4,388,362; 4,424,245; 4,444,819; 4,507,669; and 4,551,738). Another approach is to encapsulate the reactive components in microcapsules which rupture or are permeable when exposed to heat. See U.S. Pat. Nos. 4,682,194; 4,722,921; 4,742,043; 4,783,493; and 4,942,150. These protective measures will not always prevent premature coloration when exposed to a security ink.

SUMMARY OF THE INVENTION

It is an object of the present invention to provide a thermal paper with more than one security feature to prevent counterfeiting.

It is another object of the present invention to provide a thermosensitive recording material, such as thermal paper imaged with a water-based security ink that has a new security measure for determining counterfeit documents which complements the use of optically variable pigments and dyes such as thermochromic, photochromic and fluorescent pigments and dyes.

It is a further object of the present invention to provide a method for applying a security ink to thermal paper without premature coloration of the thermal paper.

It is still a further object of the present invention to provide thermal paper for cash register receipts and ATM receipts with a latent image to prevent counterfeiting.

Upon further study of the specification and appended claims, further objects and advantages of this invention will become apparent and further understood from the detailed description and claims which follow.

The above objects are achieved through thermosensitive recording materials such as thermal paper, with a thermal sensitive coating on one surface and a water-based security ink printed on the surface opposite the thermal sensitive coating, wherein said security ink comprises a water soluble, dispersible or emulsifiable pigment or dye with variable light absorption and/or transmission properties, a water repelling agent in an amount sufficient to render the ink waterproof and, optionally, a binder for said pigment or dye selected from water soluble, dispersible or emulsifiable binders. The ink components do not react with the reactive compounds on the thermal paper such that the thermal paper will still generate color when exposed to heat. This ink provides at least two modes of security, one through the variable light absorption and/or transmission properties of the images formed and the other through the image's waterproof properties. In preferred embodiments, the image also provides a pseudo-water mark.

Inks which provide images with these three modes of security are included in this invention.

In another aspect of the present invention, there is provided a method of preparing thermal paper having one thermosensitive surface and two or more, preferably three security features. This method comprises printing on the surface opposite the thermosensitive coating, a security ink comprising a water soluble, dispersible or emulsifiable pigment or dye with variable light absorption and/or transmission properties and a water repelling agent in an amount sufficient to render the image waterproof, wherein the ink is applied by a conventional printing process which does not require temperatures above 50° C.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
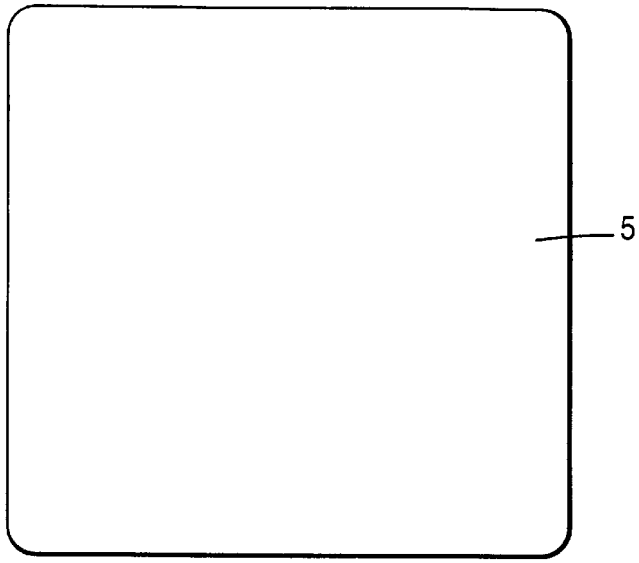
FIG. 1 illustrates thermal paper of the present invention, at a viewing angle of 90 from the surface, having a latent image printed thereon, which is illuminated by a 60 watt incandescent light bulb.

The thermal papers of the present invention have only one surface coated with a thermosensitive coating. This thermosensitive coating is preferably of the dye-developing type. Particularly suitable dye developer systems are those wherein the reactive dyes are colorless or white-colored which become dark colored when melted and exposed to a color developer. Such dyes are typically basic substances which become colored when oxidized by acidic compounds or bisphenol compounds. In these dye-developer systems, sensitizers are typically mixed with the dyes to form a blend with a reduced melting point. This reduces the amount of heat necessary to melt the dye and obtain reaction with the color developer. The components of the thermosensitive coating are often determined by the operating temperature of the thermal printer to be used. The operating temperature of conventional thermal printers varies widely, typically within the range of from 50° C. to 250° C. One skilled in the art can readily determine the melting point necessary for a desired application and select a dye and developer accordingly, or select a conventional thermal paper with a thermosensitive coating on one side. A well known dye is that identified as ODB-II with the sensitizer M-terphenyl. A preferred color developer is bisphenol A.

Color formers suitable for use in the coating formulations in thermosensitive recording materials of this invention are leuco dyes. Leuco dyes are colorless or light colored basic substances, which become colored when oxidized by acidic substances. Examples of leuco dyes that can be used herein are described as follows:

a) leuco bases of triphenylmethane dyes represented by formula I:

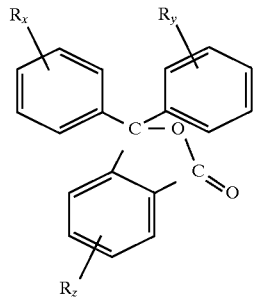

wherein Rx, Ry, and Rz of general formula I can be, independently of each other, hydrogen, hydroxyl, halogen, C1–C6 alkyl, nitro or aryl. Specific examples of such dyes are: 3,3-bis(p-dimethylaminophenyl)-phthalide, 3,3-bis(p-dimethylaminophenyl)-6-dimethylaminophthalide (Crystal Violet Lactone), 3,3-bis(p-dimethylaminophenyl)-6-diethylaminophthalide, 3,3-bis(p-dimethylaminophenyl)-6-chlorophthalide, and 3,3-bis(p-dibutylaminophenyl)-phatalide.

(b) Leuco bases of fluoran dyes represented by formula II:

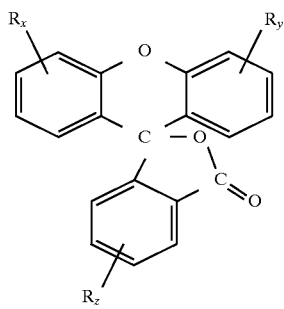

wherein Rx, Ry, and Rz of formula II are as defined above for formula I. Some examples are: 3-cyclohexylamino-6-chlorofluoran, 3-(N-N-diethylamino)-5-methyl-7-(N,N-Dibenzylamino)fluoran, 3-dimethylamino-5,7-dimethylfluoran and 3-diethylamino-7-methylfluoran.

(c) Other suitable fluoran dyes include: 3-diethylamino-6-methyl-7-chlorofluoran, 3-pyrrolidino-6-methyl-7-anilinofluoran, and 2-[3,6-bis(diethylamino)-9-(0-chloroanilino)xanthybenzoic acid lactam].

(d) Lactone compounds represented by formula III:

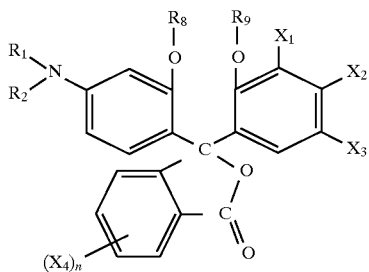

wherein R1 and R2 of formula III, independently of each other, represent hydrogen, unsubstituted C1–C6 alkyl, substituted C1–C6 alkyl, substituted phenyl, unsubstituted phenyl, cyanoethyl, -halogenated ethyl, or R1 and R2 in combination form a cyclic structure and represent —(CH2—)4, (—CH2—)5 and at least one of R8 and R9 is hydrogen and the other is hydrogen, C1–C6 alkyl, aralkyl, amyl, or phenyl; X1, X2 and X3 each, independently of each other, represent hydrogen, C1–C6 alkyl, halogen, halogenated methyl, nitro, amino or substituted amino and X4 represents hydrogen, C1–C6 alkyl or C1–C6 alkoxy and n is an integer of from 0 to 4. Specific examples of the above-mentioned compounds are: 3-(2'-hydroxy-4'-dimethylaminophenyl)-3-(2'[-methoxy-5'-chlorophenyl) phthalide, 3-(2'-hydroxy-4'-dimethylaminophenyl)-3-(2'-methoxy-5'-nitrophenyl-phthalide, 3-(2'-hydroxy-4'diethylaminophenyl)-3-(2'-methoxy-5'methylphenyl) phthalide, and 3-(2'-methoxy-4'dimethylaminophenyl)-3-(2'-hydroxy-4'-chloro-5'-methylphenyl)-phthalide.

There are many substances which change the color of the dyes by oxidizing them and function as developers. Color developers suitable for the coating formulations and thermal sensitive recording materials of this invention are phenol compounds, organic acids or metal salts thereof and hydroxybenzoic acid esters.

Preferred color developers are phenol compounds and organic acids which melt at about 50° C. to 250° C. and are sparingly soluble in water. Examples of phenol compounds include 4,4'-isopropylene-diphenol (bisphenol A), p-tert-butylphenol, 2-4-dinitrophenol, 3,4-dichiorophenol, p-phenylphenol, 4,4-cyclohexylidenediphenol. Useful examples of organic acid and metal salts thereof include 3-tert-butylsalicylic acid, 3,5-tert-butylsalicylic acid, 5-a-methylbenzylsalicylic acid and salts thereof of zinc, lead, aluminum, magnesium or nickel. Some of the color developers are 2,2,-bis(4'-hydroxyphenyl)propane (Bisphenol-A), p-phenylphenol, 2,2-bis(4'-hydroxyphenyl)-n-heptane and 4,4'-cyclohexylidene phenol.

Sensitizers or thermosensitivity promoter agents are used in the coating formulation and thermal papers of the present invention to give a good color density. The exact mechanism by which the sensitizer helps in the color forming reaction is not well known. It is generally believed that the sensitizer forms a eutectic compound with one or both of the color forming compounds. This brings down the melting point of these compounds and thus helps the color forming reaction to take place with ease at a considerably lower temperature. Some of the common sensitizers which are suitable are fatty acid amide compounds such as acetamide, stearic acid amide, linolenic acid amide, lauric acid amide, myristic acid amide, methylol compounds or the above mentioned fatty acid amides such as methylenebis (stearamide), and ethylenebis (stearamide), and compounds of p-hydroxybenzoic acid esters such as methyl p-hydroxybenzoate, n-propyl p-hydroxybenzoate, isopropyl p-hydroxybenzoate, benzyl p-hydroxybenzoate.

The thermosensitive coating compositions can be applied to any conventional base sheet suitable for use in thermal paper. The base sheet must not contain any reactive elements which would prematurely color the thermosensitive coating. The thermosensitive coating can vary in composition, as is conventionally known in the art, including the encapsulation of components therein and the use of protective layers thereon to prevent premature coloration during handling. Such thermosensitive coatings can also be applied by conventional methods using conventional equipment.

The security inks employed in the thermal papers and methods of the present invention provide more than one security measure. One feature is provided through the use of a water soluble, dispersible or emulsifiable pigment or dye with variable light absorption and/or transmission properties, referred to herein as "optically variable" pigments and dyes. These pigments or dyes need not absorb or transmit light under ambient indoor conditions, i.e., they are transparent or invisible to the naked human eye under such conditions but do absorb or transmit light when exposed to UV radiation. Pigments and dyes which transmit or absorb light under ambient conditions and absorb or transmit light at different wavelengths when exposed to ultraviolet light can also be used. The pigments and dyes used are soluble, dispersible or emulsifiable in water to provide "water-based" formulations.

Suitable pigments and dyes include the fluorescent resins produced in U.S. Pat. No. 4,328,332 from trimellitic anhydrides and propylene glycol with a zinc acetate catalyst. Representative of water soluble fluorescent dye components are fluorescein and eosine dyes and blaze orange 122-8524A, manufactured by Dayglo Color Corporation of Cleveland, Ohio. The pigment or dye employed will depend on the printing equipment to be used with the ink. Inks used in jet printing cannot contain large pigment particles or other solids in that they will clog the small orifices of the jet. Water-based printing inks applied by intaglio printing, lithography, relief printing, do not suffer from such a limitation and can contain pigments of a relatively large particle size.

Photochromic compounds which change color when exposed to UV light can also be used. Suitable photochromic compounds include the spiro compounds of formula V disclosed by Takahashi et al. in U.S. Pat. No. 5,266,447. These include spiroxazine compounds, spiropyran compounds and thiopyran compounds of the formulae in columns 5–6 of U.S. Pat. No. 5,266,447. Other examples of suitable photochromic compounds include the benzopyran compounds disclosed by Kumar in U.S. Pat. No. 5,429,774, the benzothioxanthone oxides disclosed by Fischer et al. in U.S. Pat. No. 5,177,218, the dinitrated spiropyrans disclosed by Hibino et al. in U.S. Pat. No. 5,155,230, the naphthacenequinones disclosed by Fischer et al. in U.S. Pat. No. 5,206,395 and U.S. Pat. No. 5,407,885, the naphthopyran compounds disclosed by Knowles in U.S. Pat. No. 5,384,077, the spiro(indoline) naphthoxazine compounds disclosed by VanGemert in U.S. Pat. No. 5,405,958, the ring compounds disclosed by Tanaka et al. in U.S. Pat. No. 5,106,988 and the spiro-benzoxazine compounds disclosed by Rickwood et al. in U.S. Pat. No. 5,446,151. Mixtures of such compounds are preferred and are available commercially from sources such as Color Change Corp. of Schaumburg, Ill. and Xytronyx Inc. of San Diego, Calif.

The concentration of the dye or pigment material within the security inks used in the thermal papers and methods of this invention can vary over wide limits. In general, an optical effect can be developed on most thermal papers with a fluorescent dye or photochromic pigment component present in an amount which ranges from 2–50 wt. % and preferably in an amount within the range of 10 to 50 wt. %, based on dry components of the ink used.

A key component of the security inks employed in the thermal papers and methods of this invention is a water repelling agent. This water repelling agent provides a second security for the thermal paper obtained. The water repelling agent is used in an amount sufficient to render the dry security ink waterproof, preferably with a surface tension less than 35 dynes, preferably between 20–30 dynes. Water has a surface tension of 70 dynes. In being waterproof, the image from the security ink will surface when the image is wet with water or other aqueous solution. The image of the security ink will not absorb water, forming beads thereon, and due to the distinct surface tension from the substrates, the application of water will render the image visible. A convenient method for exposing the image is to pass a water soluble ink such as in a felt marker over the image.

Suitable agents which will render the dry security ink waterproof include homopolymers of acrylic acids or a lower alkyl acrylic acids which are soluble in alkaline aqueous solution but insoluble when dry. An acrylic polymer suitable for forming such a film is formulation EC1052, available from Environmental Ink, Inc. Amounts of from 2–3.0 wt. % may be used based on the total ink composition. Alternatively, Latex 744b, commercially available from the Dow Chemical Company, may be used in an amount from 0.5–3.0% by weight of the ink composition, if components therein do not prereact the thermal paper. Latex 744b is believed to be a vinyl in water emulsion.

Other suitable water repelling materials include varnishes and silicone resins. Suitable silicone resins include polydimethylsiloxanes such as those available from General Electric Company and Dow Corning Incorporation. Suitable examples include those polydimethylsiloxanes under the trade names "SE30" and "VISC-100M" provided by General Electric Company and Silastic 4-2901 and Silastic 4-2903 provided by Dow Corning Corporation. The amount employed preferably ranges from about 0.5–10 wt. % based on the weight of dry components and most preferably ranges from 1–5 wt. %. The water repelling agent should provide a dried ink with a surface tension less than 35 dynes, preferably from 20–30 dynes. This will cause sufficient differentiation with the substrate, which typically has a surface tension of 50–60 dynes to reveal the image once wetted with water or other aqueous mixture. In certain embodiments, the ink will provide a pseudo-water mark through coloration of the ink when dried. This color may be generated by the dyes or pigments, the water repelling agents or other components of the ink.

The security inks used may contain additional additive or binder components to aid in their performance. The nature of these additives will depend on the end use. A suitable additive is a water soluble fluorescent brightener component that is used in combination with the fluorescent dye materials. The brightener typically enhances the fluorescence available from the same concentration of dye. For example, fluorescein (acid yellow 73) is an excellent fluorescent material having a peak fluorescence of 527 nm as measured by a Perkin Elmer 240 Fluorescent Spectrophotometer. Fluorescein can absorb only a given amount of ultraviolet light emitted from a standard mercury vapor light at 365 nm. However, the fluorescent brightener also absorbs energy at 365 nm and re-emits the light at 460 nm. This emission is very close to the peak absorption of fluorescein so that the net effect is fluorescein acts as if it is being radiated by a light of greater flux than is actually produced. Fluorescence can be increased by as much as five times the original value with the use of a fluorescent brightener. Care should be exercised to avoid the use of a brightener having an absorption curve which interferes with the fluorescence of the fluorescent material. Examples of brighteners include Calcofluor ABT by Cyanamid, Calcofluor A2RT by Cyanamid, Blancophor SV by GAF, Tinopal GS by Geigy, Leucophon BSW by Sandoz, Paper White SP by DuPont and Paper White BP by DuPont.

The security inks used in the thermal papers and method of this invention also comprise an aqueous based carrier for the dye or pigments, other than the water repelling agent. The carrier can comprise an aqueous solution with or without a water soluble, dispersible or emulsifiable resin binder. It is essential that any binder used have such properties to provide a water-based ink. The aqueous based carrier may contain a dispersing agent to help solubilize the pigment or dye. The inks are preferably dried/cured on the thermal paper by the evaporation of water and any other volatile components within the aqueous based carrier to leave a solid layer. Reactive inks which can form in ink layers may be used if they do not interfere with the performance of the thermal paper. The binder compounds of the carrier and the amount thereof can vary widely, depending on the printing method intended to be employed. For example, the amount of water used can vary from 1 to 70 wt. % based on the total weight of the ink formulation.

The water based inks used to prepare the thermal papers of this invention may comprise a water emulsifiable or dispersible wax and/or a water soluble, emulsifiable or dispersible thermoplastic resin binder component. The waxes can be natural waxes, including Carnauba wax, candelilla wax, beeswax, rice bran wax, petroleum waxes such as paraffm wax, synthetic hydrocarbon waxes such as low molecular weight polyethylene and Fisher-Tropsch wax, higher fatty acids such as myristic acid, palmitic acid, stearic acid and behenic acid; higher aliphatic alcohols such as steryl alcohol and esters such as sucrose fatty acid esters. Mixtures of waxes can also be used. The melting point of the wax used typically falls within the range of from 75° C. to 250° C., preferably from 75° C. to 200° C. Waxes with higher melting points are advantageous in that they aid the integrity of the printed image. When used, the amount of wax is typically greater than 5 wt. % and is preferably from 10–50 wt. %. Coating formulations which contain wax typically comprise from 20–50 wt. % total solids. To aid in the dispersion of the wax within an aqueous medium, micronized grades of wax are preferred.

Water soluble, dispersible or emulsifiable resins suitable as binders include thermoplastic resins such as polyvinyl chloride, polyvinyl acetate, vinyl chloride-vinyl acetate copolymers, polyethylene, polypropylene, polyacetal, ethylene-vinyl acetate copolymer, ethylenealkyl(meth) acrylate copolymer, ethylene-ethylacetate copolymer, polystyrene, styrene copolymers, polyamide, ethylcellulose, epoxy resin, polyketone resin, polyurethane resin, polyvinylbutyrl, styrenebutadiene rubber, nitrile rubber, acrylic rubber, ethylene-propylene rubber, ethylene alkyl (meth)acrylate copolymer, styrene-alkyl(meth)acrylate copolymer, acrylic acid-ethylene-vinylacetate terpolymer, saturated polyesters and sucrose benzoate. To obtain emulsions of polymers which are insoluble or partially soluble in water, the resin is typically ground to submicron size.

The binders may comprise two or more resins to provide specific property profiles. Thermoplastic resins typically enhance the integrity of the printed image, i.e., they enhance the smear and scratch resistance. Thermoplastic resins typically have a melting point of less than 300° C. and preferably in the range of 95° C. to 250° C. The amount of thermoplastic resin can range from 15–35 wt. %, and preferably comprises at least 25 wt. % of the formulation, based on the total dry ingredients.

The security inks used may also contain additives which vary their utility. For example, the inks may contain pigments to render the printed images visible under ambient indoor conditions or provide a pseudo-water mark on the thermal paper.

The thermal papers which contain a security ink can be prepared by the methods of this invention, wherein a security ink as described above is applied to the side of a thermal paper opposite the thermosensitive layer. The ink can be applied by any conventional means which does not require the application of heat or high temperatures. Examples include relief printing, offset printing, flexography, lithography and silkscreening. A temperature of less than 65° C. is maintained during the printing process. Once the ink is applied, the ink is dried at temperatures less than 65° C., preferably at ambient temperature. A specific example is flexographic printing, which is preferred where other indicia are printed on the reverse side of the thermal paper by flexographic printing.

To provide these formulations, the components are typically combined as dispersions at about 30 wt. % solids in a ball mill or similar conventional grinding equipment and agitated and ground. Where a wax emulsion is used, it is typically the initial material and the remaining components are added thereto with minor heating.

Without further elaboration, it is believed that one skilled in the art can, using the preceding description, utilize the present invention to its fullest extent. The entire disclosure of all applications, patents, publications, cited above and below, are herein incorporated by reference.

EXAMPLES

Example 1

A security ink composition comprising an aqueous solution of the following components is prepared within an attritor.

1) 5 to 30 wt. % UV fluorescent pigment from BASF, 2) 5 to 20 wt. % water soluble polydimethyl siloxane and 3) 30 to 80 wt. % varnish, all based on total solids.

Preparation of Thermal Paper

A mill roll of commercial thermal paper reduced to a roll 3.15" wide, 3–9" in diameter and having a thermosensitive coating on only one side thereof is used. The thermal paper is adapted for use in direct thermal printers. The security ink is printed on the roll of thermal paper using a MarkAndy flexographic press. The image printed is the logo for NCR Corporation. A substrate with a latent image is produced, a sample of which is represented in FIG. 1. The sample of imaged substrate 5 in FIG. 1 is shown as illuminated under ambient indoor conditions wherein the latent image is invisible to the naked human eye.

Security Test

Figure 2:
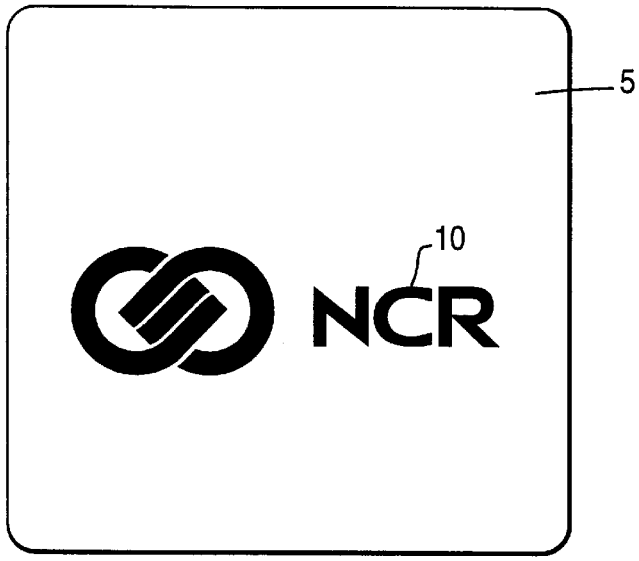
FIG. 2 illustrates a thermal paper as in FIG. 1, at a viewing angle of 90 from the surface which is illuminated under ultraviolet light.
Figure 3:
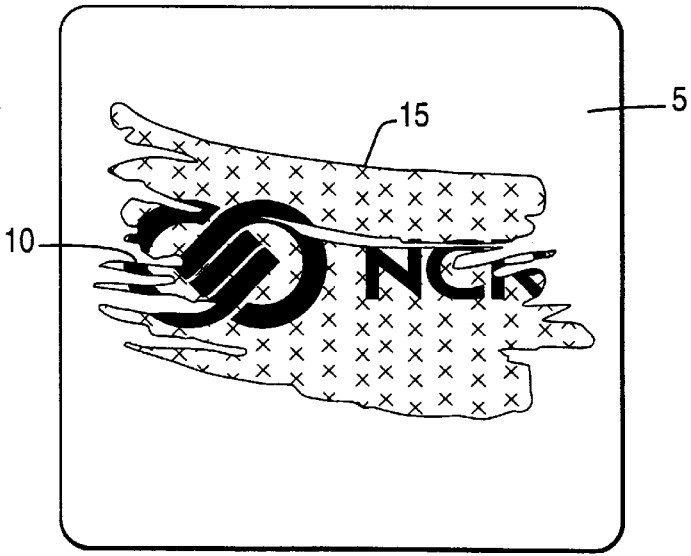
FIG. 3 illustrates a thermal paper of FIG. 1 at a viewing angle of 90 from the surface which is overwritten with a water soluble ink and illuminated with a 60 watt incandescent light bulb.
Figure 4:
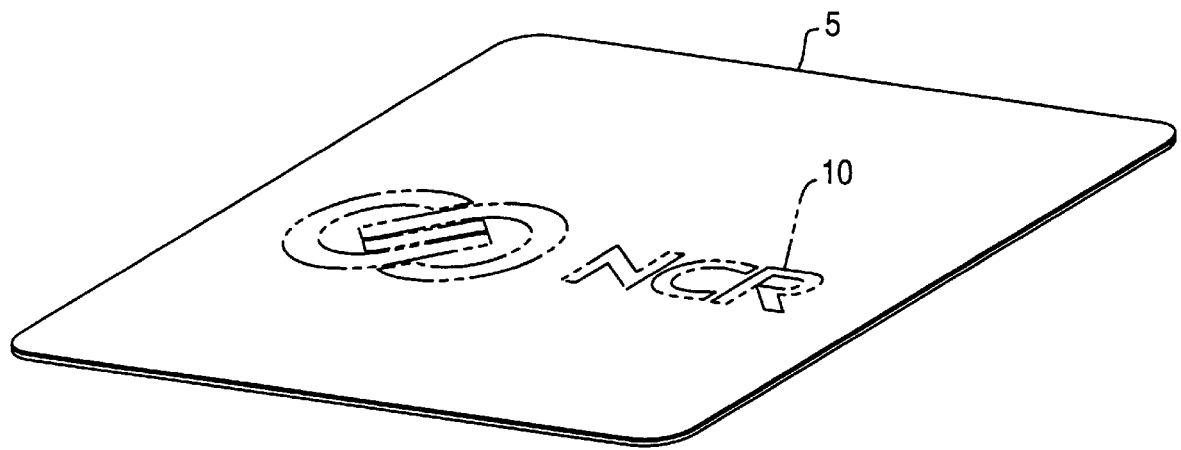
FIG. 4 illustrates a thermal paper as in FIG. 1 at a viewing angle of 30 from the surface and illuminated with a 60 watt incandescent light bulb.

Imaged substrate 5 produced in Example 1 is tested for luminescence and for waterproofness. FIG. 2 shows imaged substrate 5 illuminated with a UV light from a mercury arc lamp operating at 365 nm to fully reveal latent image 10 and FIG. 3 shows substrate 5 with the latent image 10 passed over with a highlight pen (pink) to form overwriting 15 and reveal the image by the differentiation in water absorption between the latent image 10 and the substrate. FIG. 4 shows substrate 5 at an angle less than 45 from the surface thereof to reveal a pseudo-watermark.

Example 2

The inks used can have a solids content which ranges widely such as from 20 to 80 wt. %. For flexographic printing, a solids content of about 50 wt. %, i.e., from 40–60 wt. % is preferred. Suitable flexographic printers are provided by Wolverine and Mark Andy.

A security ink having a pH of 8–9 with a water-based tracer and silicone resin is used. The viscosity of the ink falls within the image of 20–24 with a #2 Zahn cup. The ink comprised about 10 wt. % silicone based on the total composition. Water comprised about 47 wt. % of the formulation. Water soluble organics (ethylene glycol and ethers) comprised about 1.2 wt. %. The ink also contained octylphenoxy polyethoxy ethanol. The ink is applied to a commercial Appleton T-1012 A thermal fax paper and standard transaction receipt paper on the uncoated surface using a Mark Andy flexographic printer (with an open pan, 440 anilox roll. The plate was of the NCR logo.

The paper was recovered and tested for thermal printing and dynamic sensitivity. Both showed suitable print density from conventional thermal printers operating with a pulse time of at least 0.38 milliseconds.

The paper was tested for security features by overwriting with an Abby Ph pen and the latent "NCR" image was defined. The paper was tested for manipulation with an ink jet printer. The ink was found to react with the thermosensitive coating.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermosensitive recording material comprising a base sheet, a thermosensitive coating on only one surface of said base sheet and a latent image on the surface of the base sheet opposite the thermosensitive coating, wherein said image comprises a dried waterproof ink which comprises a water soluble, dispersible or emulsifiable pigment or dye with variable light absorption and/or transmission properties and a water repelling agent in an amount sufficient to render the image waterproof.

2. A thermosensitive recording material as in claim 1, wherein the water repelling agent is selected from the group consisting of polysiloxane polymers, vinyl polymers, acrylic polymers and varnishes derived from natural and synthetic resins.

3. A thermosensitive recording material as in claim 1 which comprises a thermal paper.

4. A thermal paper as in claim 3, wherein the water soluble, dispersible or emulsifiable pigment or dye is selected from the group consisting of fluorescent pigments and dyes and photochromic pigments and dyes.

5. A thermal paper as in claim 3, wherein the water repelling agent is selected from the group consisting of polydimethylsiloxanes, homopolymers and copolymers of acrylic acid and/or (lower alkyl)acrylic acid.

6. A thermosensitive recording material as in claim 1, wherein the image is transparent to the naked human eye under illumination with a 60 watt incandescent light bulb and visible to the naked human eye when exposed to ultraviolet light at a wavelength of 365 nm.

7. A thermal paper as in claim 3, wherein the dried waterproof ink additionally comprises a water soluble, dispersible or emulsifiable binder resin, wax or both.

8. A thermal paper as in claim 3, wherein the amount of water soluble, dispersible or emulsifiable pigment with variable light absorption and/or transmission properties ranges from 2 wt. % to 50 wt. % based on dried components.

9. A thermal transfer paper as in claim 3, wherein the water soluble, dispersible or emulsifiable pigment or dye is selected from photochromic and fluorescent pigments and dyes selected from the group consisting of spiral oxazine compounds and derivatives thereof, spiral pyran compounds and derivatives thereof, thiopyran compounds and derivatives thereof, naphthabenzopyran compounds and derivatives thereof, spiro(indoline) naphthooxazine compounds and derivatives thereof, spirobenzooxazine compounds and derivatives thereof, benzothiooxathone compounds and derivatives thereof, and naphthacene quinone compounds and mixtures thereof, and fluorescein dyes and eosine dyes.

10. A thermal paper as in claim 3, wherein the water repelling agent is selected from homopolymers of acrylic acid, copolymers of (lower alkyl) acrylic acids, and polydimethylsiloxane.

11. A thermal paper as in claim 3, wherein the dried waterproof ink comprises from 20–80 wt. % of said dried ink based on total solids.

12. A thermal paper as in claim 3, wherein the dried waterproof ink has a surface tension less than 35 dynes.

13. A thermal paper as in claim 3, wherein the dried waterproof ink is transparent.

14. A thermal paper as in claim 3, wherein the dried waterproof ink provides a pseudo-water mark at a viewing angle of less than 90 from the plane or the surface for said thermal paper.

15. A thermal paper as in claim 3, wherein the thermosensitive layer comprises a dye developer system, wherein the dye is a leuco dye and the developer is selected from phenols or acidic materials.

16. A method of preparing a thermal paper having more than one security feature which comprises printing the base sheet of the thermal transfer paper with an ink composition comprising a water soluble, dispersible or emulsifiable pigment or dye with variable light absorption and/or transmission properties in an amount sufficient to provide variable light absorption and/or transmission properties once the ink is dry and a water repelling agent in an amount sufficient to render the dry ink waterproof, wherein said security ink is printed on a side uncoated with a thermosensitive coating.

17. A method as in claim 16, wherein the image is applied by flexographic printing method.

18. A method as in claim 16, wherein the ink is applied by a relief printing method at a temperature less than 50° C.

19. A method as in claim 16, wherein the water repelling material is selected from polysiloxanes, vinylpolymers, acrylic polymers and varnishes of synthetic and natural polymers.

20. A method as in claim 19, wherein the ink contains a water-based carrier which is evaporated at a temperature less than 50° C.

21. A method as in claim 16, wherein the amount of water repelling agent falls within the range of 20–80 wt. % of the ink formulation, based on solids.

22. A method as in claim 21, wherein the security ink additionally comprises a water soluble, dispersible or emulsifiable resin binder, wax or both.

23. A method as in claim 22, wherein the thermal paper has a thermosensitive coating with reactive components based on a dye-developer system, wherein the dye comprises a leuco dye and the developer is selected from phenolic compounds and acidic compounds.

* * * * *